(12) United States Patent
Hirakawa et al.

(10) Patent No.: US 12,115,705 B2
(45) Date of Patent: Oct. 15, 2024

(54) METHOD OF MANUFACTURING SOUNDPROOF MATERIAL

(71) Applicant: NISHIKAWA RUBBER CO., LTD., Hiroshima (JP)

(72) Inventors: Yuzo Hirakawa, Hiroshima (JP); Satoshi Rikimaru, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 190 days.

(21) Appl. No.: 18/060,067

(22) Filed: Nov. 30, 2022

(65) Prior Publication Data

US 2023/0173721 A1 Jun. 8, 2023

(30) Foreign Application Priority Data

Dec. 2, 2021 (JP) ................. 2021-196108

(51) Int. Cl.
*B29C 44/34* (2006.01)
*B29K 21/00* (2006.01)
*B29K 507/04* (2006.01)
*B60R 13/08* (2006.01)

(52) U.S. Cl.
CPC ...... *B29C 44/3415* (2013.01); *B29K 2021/00* (2013.01); *B29K 2507/04* (2013.01); *B60R 13/0815* (2013.01)

(58) Field of Classification Search
None
See application file for complete search history.

(56) References Cited

U.S. PATENT DOCUMENTS

| 6,277,231 | B1 | 8/2001 | Ducruy | |
|---|---|---|---|---|
| 2007/0259994 | A1 | 11/2007 | Tour et al. | |
| 2011/0076435 | A1 | 3/2011 | Tachibana et al. | |
| 2011/0233479 | A1* | 9/2011 | Korzhenko | B29C 48/41 252/511 |
| 2016/0176111 | A1* | 6/2016 | Paschkewitz | B29C 64/112 425/174.4 |
| 2017/0200441 | A1* | 7/2017 | Mohammadi Gojani | B32B 9/041 |

FOREIGN PATENT DOCUMENTS

| JP | S53-47625 A | 4/1978 |
|---|---|---|
| JP | H07-108594 A | 4/1995 |
| JP | 2001-524037 A | 11/2001 |
| JP | 2003-053815 A | 2/2003 |
| JP | 2007-524727 A | 8/2007 |
| JP | 2010-085818 A | 4/2010 |

(Continued)

*Primary Examiner* — Nahida Sultana
(74) *Attorney, Agent, or Firm* — Pearne & Gordon LLP

(57) ABSTRACT

A soundproof material includes rubber sponge having a specific gravity of 0.2 or less, which is formed by extrusion molding and a subsequent crosslinking and foaming of a rubber composition using a microwave heating device. The rubber composition includes at least raw material rubber, a crosslinking agent, a foaming agent, and carbon black. The soundproof material has a rectangular cross-sectional outer shape, has at least two hollow parts inside formed by a lateral partition wall extending in a left-right lateral direction and at least two hollow parts formed by a vertical partition wall extending in a vertical direction. The method includes adding carbon nanotubes to the rubber composition.

2 Claims, 16 Drawing Sheets

(56) References Cited

FOREIGN PATENT DOCUMENTS

| | | |
|---|---|---|
| JP | 5543642 B2 | 7/2014 |
| JP | 2016-222190 A | 12/2016 |
| JP | 2017-116706 A | 6/2017 |
| JP | 2018-039339 A | 3/2018 |
| JP | 6795892 B2 | 12/2020 |

\* cited by examiner

METHOD OF MANUFACTURING SOUNDPROOF MATERIAL

CROSS REFERENCE TO RELATED APPLICATION

This application claims the benefit under 35 USC § 119 of JP Patent Application JP 2021-196108 filed Dec. 2, 2021, the entire disclosure of which is incorporated herein by reference.

BACKGROUND INFORMATION

The present invention relates to a method of manufacturing a soundproof material to be attached to, for example, an automobile door.

An article as illustrated in FIGS. 10 and 11 is known as a soundproof material that is applied to a sheet body part 11 of a door hole seal 10 to be attached to an automobile door 100.

The automobile door 100 includes a door outer panel 101 and a door inner panel 102. The door hole seal 10 is provided between the door inner panel 102 and a door trim 103 and covers an opening H, provided in the door inner panel 102, to attain sound absorbing and waterproof functions of the interior of the door 100.

The door hole seal 10 includes a sheet body part 11 and a polyethylene (PE) film 12, which are integrally thermal welded (at welded parts T) into a single unit. The sheet body part 11 is formed by a highly foamed sponge rubber sheet. The sheet body part 11 has a plurality of ridge-shaped concave-convex parts 11a at an inner-cabin side of the sheet body part 11. The PE film 12 is provided with butyl rubber sealing agents 13 as adhesive, which firmly attaches the door hole seal 10 to the door inner panel 102.

EPDM may be used as raw-material rubber forming the sheet body part 11. Unfortunately, however, belt-shaped EPDM sponge with a reduced thickness is likely to have a reduced sound absorbing function for road noise (low frequency band zone), in particular, due to its main characteristics of sound absorbing function with use of surface vibrations.

Besides the art discussed above, use of fiber-based sound absorbing material in the space between the door inner panel 102 and the door trim 103 is known (illustration omitted).

To achieve sufficient sound absorbing function with respect to the road noise (low frequency band zone) using the fiber-base sound absorbing material, the material needs to have an increased thickness, more than 40 mm, for example. This may be disadvantageous for the recent automobile design that requires strict space efficiency.

In addition, the fiber-based sound absorbing material absorbs water. Thus, if the fiber-based sound absorbing material receives water containing impurities such muddy water, the material is likely to have reduced sound absorbing function due to accumulation of the impurities such as mud inside the fiber and due to freezing of the absorbed water under cold weather. Therefore, the fiber-based sound absorbing material is usable within a limited area that is out of permeation of water.

In view of those problems, FIG. 1 of Japanese Unexamined Patent Publication No. 2017-116706, discloses a resonant sound absorbing structure 1, which includes a plurality of resonant tube parts 2 illustrated in FIG. 12.

This structure includes 100 or more of resonant tube parts 2, each having a first end opened with a cross-sectional area of 400 mm² or less and a second end closed, are disposed side by side. This structure efficiently absorbs mid-low frequency sound in a confined space such as an automobile cabin.

Furthermore, as illustrated in FIG. 13, FIG. 5 of Japanese Patent No. 6795892 discloses an extrusion molded sound absorbing sheet 3, which is extrusion-molded and using EPDM sponge. The sound absorbing sheet 3 includes a hole formed area 8A on the upper side part and a hole non-formed area 8B on the lower side part. In the hole-formed area 8A, a large number of holes 7 are formed in a foamed layer 6, each in a distanced manner, between a front-side skin layer 4 and a rear-side skin layer 5, the holes 7 reaching the front-side skin layer 4. In the hole non-formed area, such holes 7 are absent.

This sheet, which has a simple structure with the front-side skin layer 4, the rear-side skin layer 5, and the foamed layer 6 between the front-rear-side skin layers 4, 5 and is an extrusion molded product, can be integrally molded easily.

In addition, the foamed layer 6 has the holes 7 reaching the front-side skin layer 4, so that sounds advancing to the sound absorbing sheet 3 enters the holes 7 and even to air bubbles 6a that are formed in the foamed layer 6 and some opened in the holes 7. With this configuration, the sounds are converted into the sound energy and thermal energy, and thereby absorbed effectively.

Furthermore, the sound absorbing sheet 3, which has a lot of holes 7 on the upper side part and has no holes on the lower side part, has an improved sound absorbing function with respect to each sound having different frequency characteristics, e.g., wind noise and road noise.

Unfortunately, however, Japanese unexamined Patent Publication No. 2017-116706, FIG. 12 is complex and expensive to manufacture, since a multiple number of resonant tube parts 2 are connected together using fixing members such as adhesive sheets, coupling bands, screws, and rivets.

In addition, Japanese unexamined Patent Publication No. 2017-116706 indicates that the sheet can be integrally molded by extrusion molding, etc. However, the second end of the tube part with respect to the first end, which is open, is closed. Thus, a closing operation in addition to the extrusion molding is required.

Furthermore, the resonant tube parts 2 is formed by synthetic resin (plastic), paper, metal, or a combination of these materials, and 100 or more of the tube parts 2 are arranged side by side, leading to a heavy product.

Among them, a paper product is usable within a limited area that is out of reach for splash of water and a metal product needs care for rust.

FIG. 13 of Japanese Patent No. 6795892 needs a careful and time-consuming coupling operation due to the structure with the hole formed area 8A on the upper side part and the hole non-formed area 8B without holes on the lower side part, though this sheet is lighter in weight and easier in extrusion molding than the configuration disclosed in Japanese unexamined Patent Publication No. 2017-116706.

In addition, this configuration is complex to manufacture as the large number of holes 7 are formed by irradiation of laser beams.

Furthermore, this configuration performs an insufficient sound absorbing effect in the low frequency of about 800 Hz to 1,000 Hz while it performs a sufficient sound absorbing effect in the frequency of about 1,000 Hz to 2,000 Hz.

Therefore, an object of the present invention is to provide a method of manufacturing a sound absorbing material that has a simple structure, is easy to attach, and improved in a sound absorbing function.

SUMMARY

To achieve the above-mentioned object, an aspect of the invention provides a method of manufacturing a soundproof material (50). The soundproof material (50) includes rubber sponge having a specific gravity of 0.2 or less. The rubber sponge is formed by extrusion molding and a subsequent crosslinking and foaming of a rubber composition using a microwave heating device. The rubber composition includes at least raw-material rubber, a crosslinking agent, a foaming agent, and carbon black.

The soundproof material (50) has a rectangular cross-sectional outer shape, has at least two hollow parts (58) inside formed by a lateral partition wall (55) extending in a left-right lateral direction, and has at least two hollow parts (58) inside formed by a vertical partition wall (56) extending in a vertical direction.

The method includes adding carbon nanotubes to the rubber composition.

In addition, according to an aspect of the present invention, the amount of the carbon nanotubes to be added is 3.0 phr or less.

Symbols in parentheses show constituents or items corresponding to the drawings.

According to the present invention, the soundproof material manufactured by the method generates high heat by microwaves and, at the same time, has low specific gravity after foaming, in a satisfying manner. This is because the rubber composition of the rubber sponge forming the soundproof is added with carbon nanotubes. The rubber sponge has the specific gravity of 0.2 or less and is obtained by extrusion molding and a subsequent crosslinking and foaming, by the microwave heating device. The rubber composition additionally contains at least the raw-material rubber, the crosslinking agent, the foaming agent, and carbon black. The soundproof material has the rectangular cross-sectional outer shape, has at least two hollow parts inside formed by the lateral partition wall extending in the left-right lateral direction, and has at least two hollow parts inside formed by the vertical partition wall extending in the vertical direction.

As a result, the soundproof material after crosslinking and foaming by the microwave heating device has a stabilized cross-sectional shape with flat upper and lower surfaces.

As discussed above, adding a small amount of carbon nanotubes, e.g., 3.0 phr, to the rubber composition allows manufacture of the soundproof material composed of rubber sponge having the specific gravity of 0.2 or less, the soundproof material being formed in a designed shape and having a plurality of hollow parts.

The soundproof material manufactured by this method is usable in places where water splashes due to its excellent hydrophobicity, since it is composed of rubber sponge with the specific gravity of 0.2 or less and the soundproof material as a whole is extrusion-molded, crosslinked, and foamed.

EPDM sponge, in particular, has a thin layer called a "skin layer" on an outer side part in cross section. This skin layer has a higher density and elasticity than a foamed layer, thus inhibiting entrance of water toward interior but allowing entrance of sound by vibration of the elastic thin layer. Entrance of the sound (sound waves) into interior causes attenuation of energy, resulting in an effective absorption of the sound.

In addition, the soundproof material shifts the sound absorption peak to lower frequencies such as about 800 Hz to 1,000 Hz because of a plurality of hollow parts forming air layers, which are partitioned by the lateral and vertical partition walls.

Shifting positions of the lateral and vertical partition walls to change the size of the hollow parts allows fine adjustment of the sound absorption peak at ease.

DETAILED DESCRIPTION

The structure of a soundproof material 50 manufactured by the method according to an embodiment of the present invention will be described with reference to the drawings. This sound proof material 50 is applied to a sheet body part 31 of a door hole seal 30 to be attached to an automobile door 100. When constituents or items correspond to those in prior arts, the same symbols are used.

Figure 1:
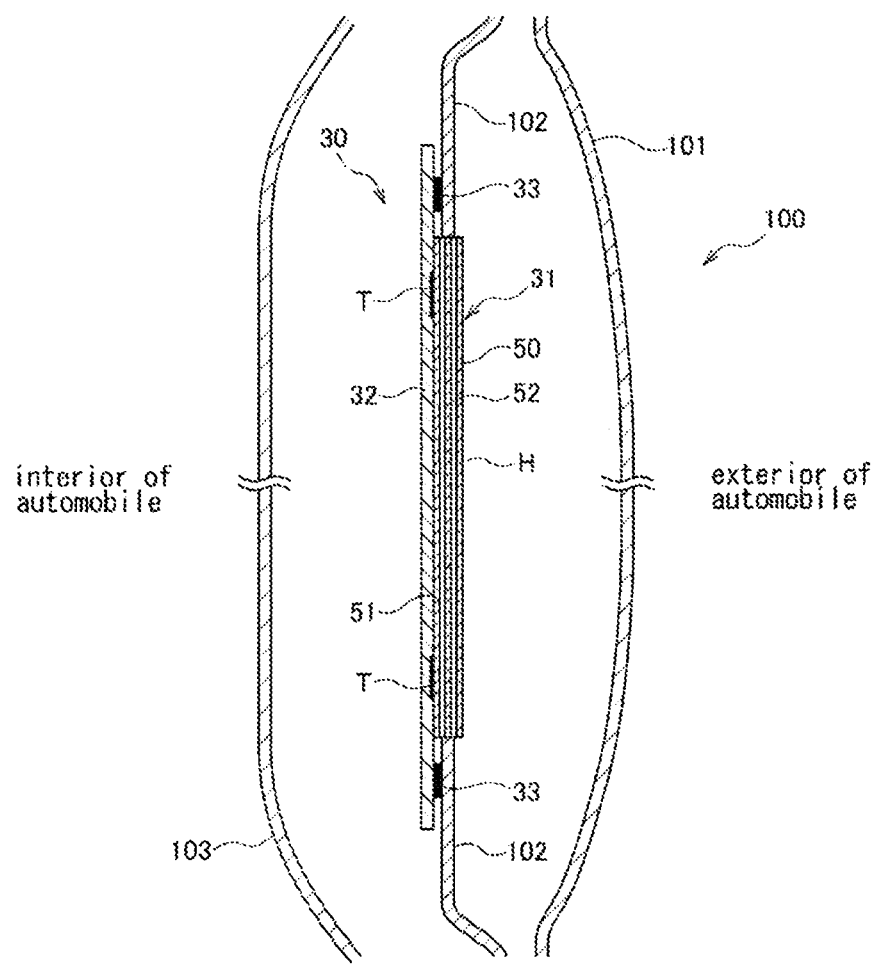
FIG. 1 is an enlarged cross-sectional view taken along line I-I in FIG. 10, illustrating a soundproof material 50 manufactured by a method according to an embodiment of the present invention coupling to a door.
Figure 10:
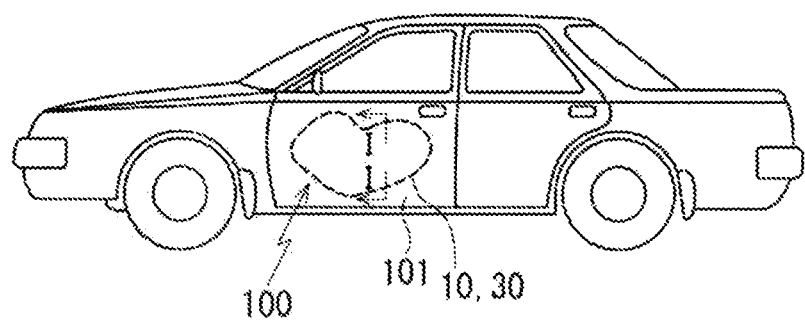
FIG. 10 is a side view of an appearance of an automobile.
Figure 11:
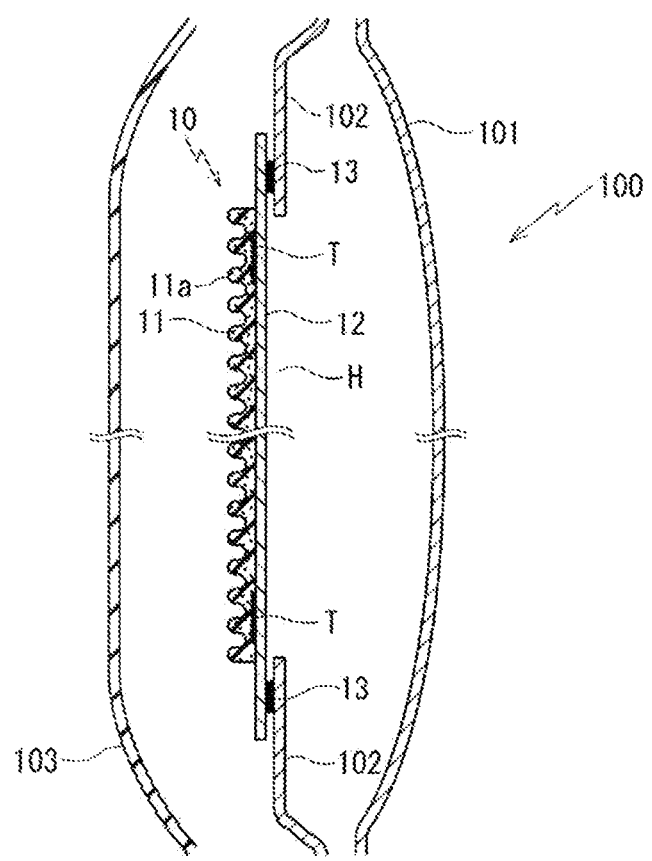
FIG. 11 is an enlarged cross-sectional view taken along line I-I in FIG. 10, illustrating a conventional soundproof material coupling to the door.
Figure 12:
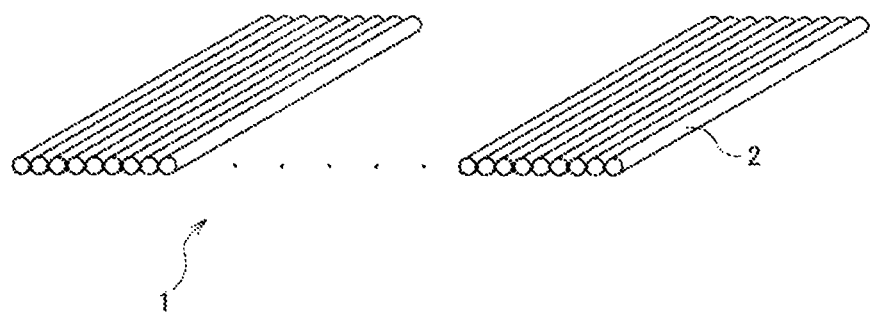
FIG. 12 is a perspective view of another conventional soundproof material.
Figure 13:
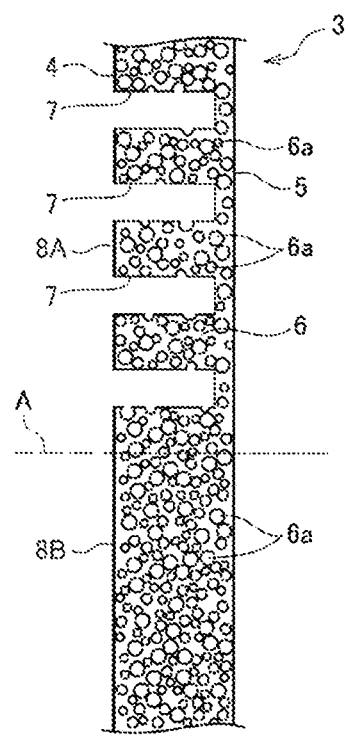
FIG. 13 is a cross-sectional view of still another conventional soundproof material.

As illustrated in FIGS. 1 and 10, the door hole seal 30 is provided to a door inner panel 102, which configures the door 100 together with a door outer panel 101 and faces a door trim 103, and covers an opening H formed in the door inner panel 102.

The door hole seal 30 includes a sheet body part 31 having an excellent sound insulation and absorption performances and a synthetic resin film (PE film) 32 integrally united to the sheet body part 31 by thermal welding (welding part T), to place the sheet body part 31 in the door inner panel 102.

A butyl rubber seal agent 33 as an adhesive is provided on an outer side surface of the synthetic resin film 32 so that the door hole seal 30 is firmly attached to the door inner panel 102.

Alternatively, the sheet body part 31 may be integrated with a resin mold product in place of the PE film 32, or it may be integrated directly with the door inner panel 102. The resin mold product may be provided with claw-shaped engaging parts as engagement means to integrate the sheet body part 31 with the resin mold product. The sheet body part 31 may be provided, in advance, with fixing means such as clips, double-sided tapes, adhesive, and hot melt for attachment to the door inner panel 102 to integrate the sheet body part 31 directly to the door inner panel 102.

As illustrated in FIG. 1, the sheet body part 31 is attached to the outer-cabinet side of the PE film 32. Alternatively, it can be attached to the inner-cabinet side of the PE film 32.

When attached to the door 100, the upper and lower ends of the sheet body part 31 are opened.

The soundproof material 50 to be applied to the sheet body part 31 has a belt shape, has a specific gravity of 0.2 or less, is formed by EPDM sponge, is entirely extrusion molded, and is crosslinked and foamed. The soundproof material 50 is more preferably further highly foamed one with a low specific gravity of 0.15 or less. In this embodiment, EPDM is employed as the raw-material rubber of the rubber sponge forming the soundproof material 50 in view of sound control performance, productivity, durability, etc. Alternatively, other rubbers can be used as far as they can form skin layers through extrusion molding and crosslinking and foaming. Those rubbers include, for example, natural rubber (NR), nitrile rubber (NBR), silicone rubber (Q), styrene rubber (SBR), and chloroprene rubber (CR).

Figure 2:
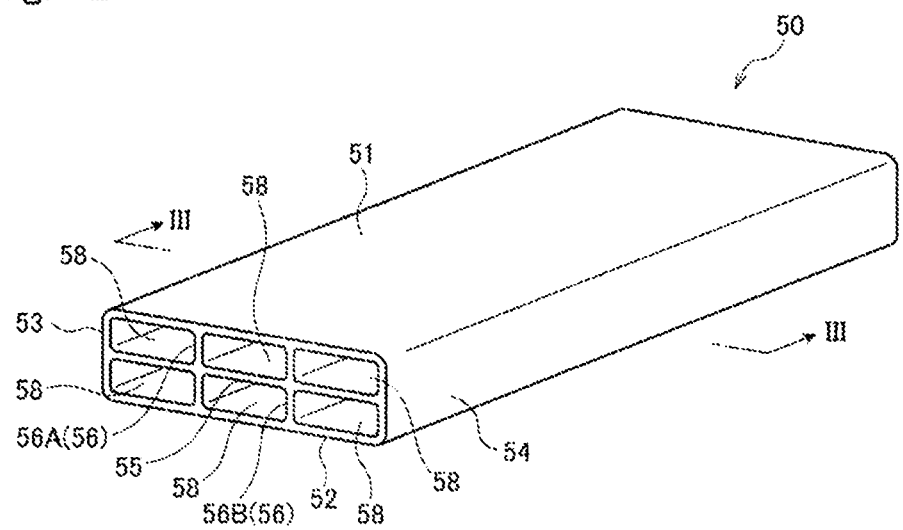
FIG. 2 is a perspective view illustrating the soundproof material 50.
Figure 3:
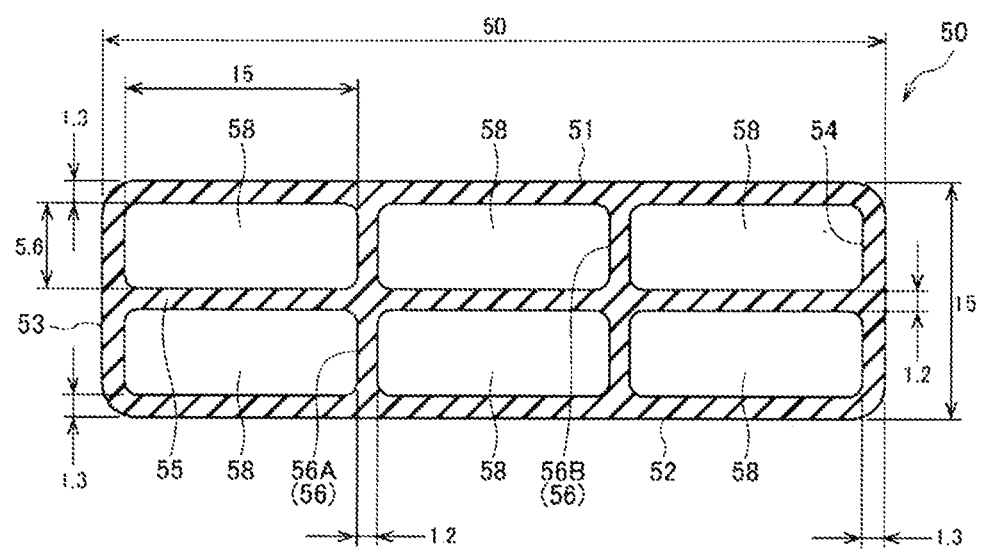
FIG. 3 is an enlarged cross-sectional view taken along line III-III in FIG. 2.

As illustrated in FIGS. 2 and 3, the soundproof material 50 has flat upper and lower surfaces 51, 52, has at least two upper and lower hollow parts 58 formed by a lateral partition wall 55 extending in a left-right lateral direction, and has at least two left and right hollow parts 58 formed by a vertical partition wall 56 extending in a vertical direction. This embodiment shows six hollow parts 58 in total, particularly, two hollow parts 58 in the vertical direction formed by single lateral partition wall 55 and three hollow parts 58 in the lateral direction formed by two vertical partition walls 56 (56A, 56B).

The dimensions of the soundproof material are defined as illustrated in FIG. 3 such that: the widths of the upper and lower surfaces 51, 52 in the left-right direction (lateral direction) each are 50 mm; the heights of the left and right side surfaces 53, 54 in the vertical direction each are 15 mm; the thicknesses of the upper and lower surfaces 51, 52 each are 1.3 mm; the thicknesses of the left and right side surfaces 53, 54 each are 1.3 mm; and the thicknesses of the lateral partition wall 55 and the vertical partition wall 56 (56A, 56B) each are 1.2 mm. To provide six hollow parts with the same size, the lateral partition wall 55 is positioned at the center of the height in the vertical direction while two vertical partition walls 56 (56A, 56B) are positioned so as to equally divide the length into three parts in the lateral direction. With this, each hollow part 58 has a width of 15 mm in the lateral direction and a length of 5.6 mm in an up-down direction (vertical direction).

As illustrated in FIG. 1, the soundproof material 50 is firmly attached with its upper surface 51 or lower surface 52 to the PE film 32. Several number of soundproof materials 50 extending vertically are arranged side by side in a lateral direction (from the front side to the rear side of the door 100), thereby forming the sheet body part 31. The soundproof materials are merely abutting to one another in the lateral direction. Alternatively, they can be fixed together with an adhesive or the like. When the sheet body part 31 is to be attached to the door inner panel 102 without use of the PE film but with use of the fixing means such as clips, either one of the upper surface 51 and the lower surface 52 is attached to the door inner panel 102.

The sheet body part 31 has holes or notches, not illustrated, on its side surfaces for penetration of various cables and insertion of hands of operators during installation operation.

In actual manufacture, forming uniform hollow parts 58 by provision of lateral and vertical partition walls 55, 56 is difficult and the upper and lower surfaces within a permissible range of flatness cannot be achieved in a soundproof material that is extrusion molded and crosslinked and foamed from EPDM sponge having a specific gravity of 0.2 or less.

Figure 4A:
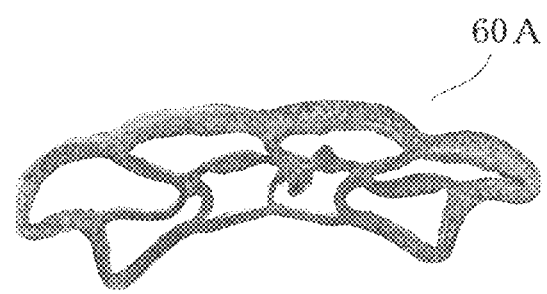
FIG. 4A is a photograph showing a cross-sectional view of a soundproof material 60A having non-flat upper and lower surfaces.

Thus, the soundproof material 60A as illustrated in FIG. 4A, for example, having non-flat upper and lower surfaces is adversely manufactured. Accordingly, there has been no previous soundproof material 50 having flat upper and lower surfaces 51, 52, at least two hollow parts 58 in the vertical direction formed by a lateral partition wall 55 extending in the left-right lateral direction, and at least two hollow parts 58 in the lateral direction formed by a vertical partition wall 56 extending in the vertical direction.

Thus, in the present embodiment, the "flatness" is defined as follows and a soundproof material 50 satisfying the definition is successfully manufactured.

Here, the soundproof material having an ideal shape is denoted by reference numeral 50 as illustrated in FIGS. 2 and 3, while soundproof materials having flat upper and lower surfaces actually manufactured by extrusion molding and crosslinking and foaming are denoted by reference numerals 50A and 50B.

Figure 5A:
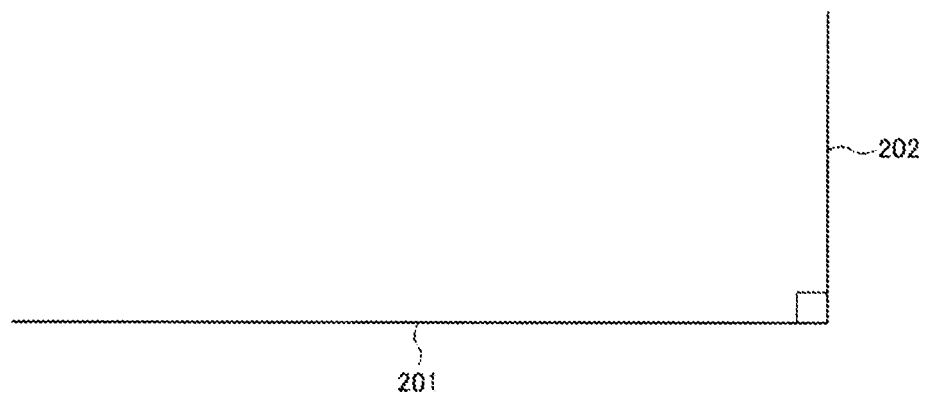
FIG. 5A is a cross-sectional view of a corner part before the soundproof material 50A is placed for a process of measuring a degree of flatness of the soundproof material 50A.
Figure 5B:
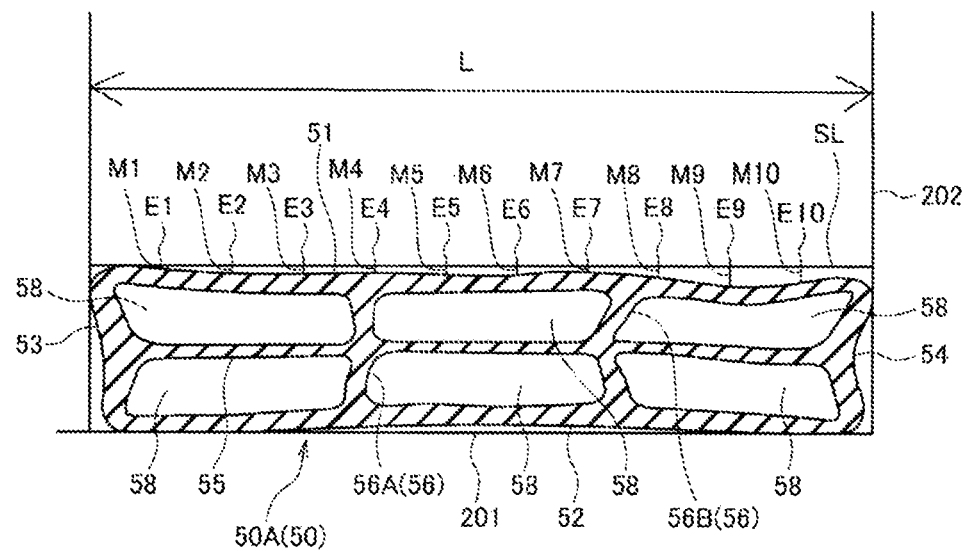
FIG. 5B is a cross-sectional view of the corner part after the soundproof material 50A is placed.

Specifically, the "flatness" is defined by a cross-sectional shape of a soundproof material 50A illustrated in FIG. 5B, which is brought into contact with a horizontal surface 201 and a vertical surface 202 with no deformation of the soundproof material 50A, the surfaces 201, 202 together forming a corner part as illustrated in FIG. 5A.

Specifically, a cross-sectional width L in the left-right direction of the upper surface 51 of the soundproof material 50A is obtained, first. The cross-sectional width L is a distance between a left side surface 53 and a right side surface 54 of the soundproof material 50A. The left side surface 53 in the cross-sectional width L is a vertical plane passing through the leftmost part of the soundproof material 50A while the right side surface 54 in the cross-sectional width L is a vertical plane passing through the rightmost part of the soundproof material 50A.

Next, a flat reference line SL is defined that is in parallel with a horizontal plane and passes through the highest point of the upper surface 51.

Then, within the range of the cross-sectional width L, the flat reference line SL is divided, with a laterally equal distance, into a plural number, 10 points (E1 to E10) in this case, and the distances (M1 to M10) of the lines extending downward from the 10 points and intersecting the upper surface 51 are obtained. Defining 10 dividing points (E1 to E10) within the cross-sectional width L results in the flat reference line SL equally divided into 11. Here, the leftmost point E1 is not aligned with the left side surface 53 while the right most point E10 is not aligned with the right side surface 54. For improved accuracy, the number of the plurality of points laterally dividing the flat reference line SL with an equal distance is preferably 10 or more.

Next, the average value (MA) is obtained from the distances (M1 to M10).

Then, the "flatness" of the upper surface 51 is defined by the percentage that is obtained by dividing the average value (MA) by the cross-sectional width (L) ((MA/L)×100). The percentage of the flatness is defined 2% or less for improved flexibility of the sheet body part 31 of the present invention.

Similarly, the "flatness" of the side of the lower surface 52 can be defined through 180-degree reversal of the soundproof material 50A in the corner part, formed of the horizontal surface 201 and the vertical surface 202, before bringing it into contact with the horizontal and vertical surfaces 201, 202 in a non-deformed manner.

Figure 6:
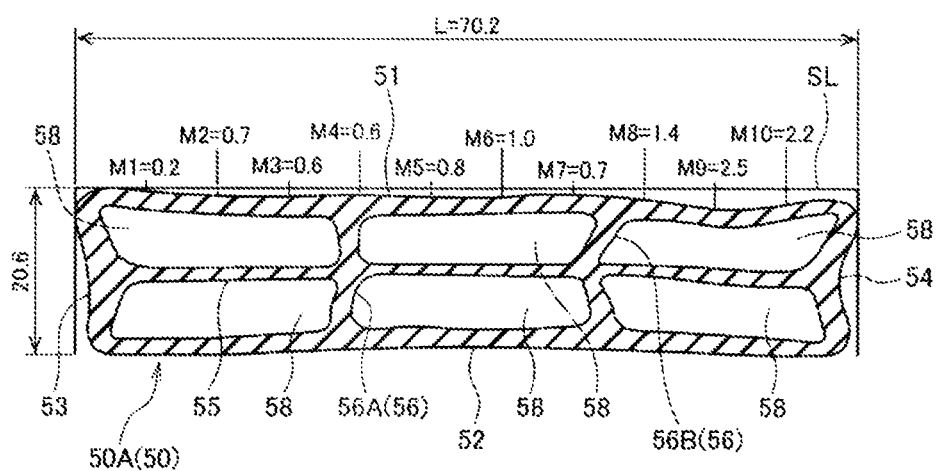
FIG. 6 is a cross-sectional view of the soundproof material 50A under measurement of the degree of flatness.

The particular size of the soundproof material 50A illustrated in FIG. 5 is presented in FIG. 6. Specifically, the cross-sectional width L=70.2 mm, M1=0.2 mm, M2=0.7 mm, M3=0.6 mm, M4=0.6 mm, M5=0.8 mm, M6=1.0 mm, M7=0.7 mm, M8=1.4 mm, M9=2.5 mm, M10=2.2 mm, and the average value=1.07 mm.

Here, the percentage of the flatness becomes 1.5%, that is below 2%, with which it can be said that the upper surface 51 of the soundproof material 50A is flat. The percentage is obtained by diving the average value MA (1.07 mm) by the cross-sectional width L (70.2 mm) ((MA/L×100)).

Figure 7:
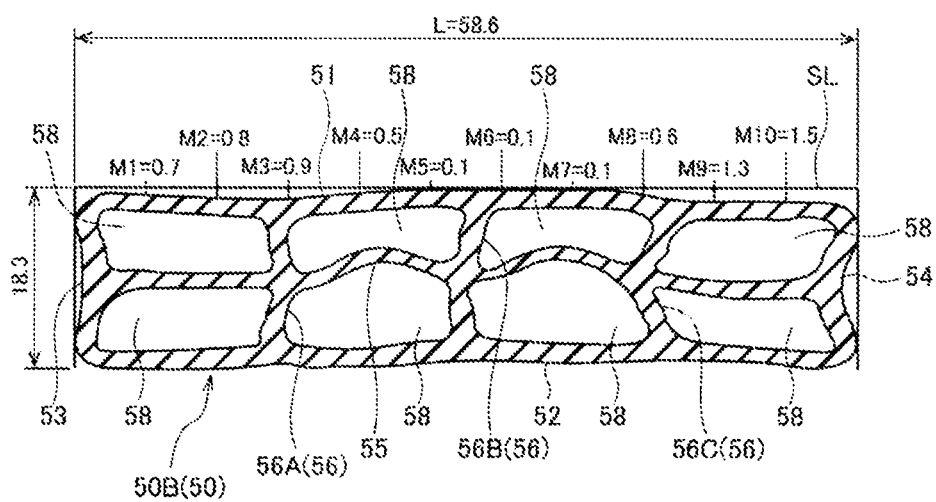
FIG. 7 is a cross-sectional view of the soundproof material 50B under the measurement of the degree of flatness.

The soundproof material 50B illustrated in FIG. 7 includes eight hollow parts 58 in total, particularly, two hollow parts 58 in the vertical direction formed by a single lateral partition wall 55 and four hollow parts 58 in the lateral direction formed by three vertical partition walls 56 (56A, 56B, 56C).

The size of the soundproof material 50B is such that the cross-sectional width L=58.6 mm, M1=0.7 mm, M2=0.8 mm, M3=0.9 mm, M4=0.5 mm, M5=0.1 mm, M6=0.1 mm, M7=0.1 mm, M8=0.6 mm, M9=1.3 mm, M10=1.5 mm, and the average value=0.66 mm.

Here, the percentage of the flatness becomes 1.1%, that is also below 2%, with which it can be said that the upper surface 51 of the soundproof material 50B is flat. The percentage is obtained by diving the average value MA (0.66 mm) by the cross-sectional width L (58.6 mm) ((MA/L×100)).

Figure 8:
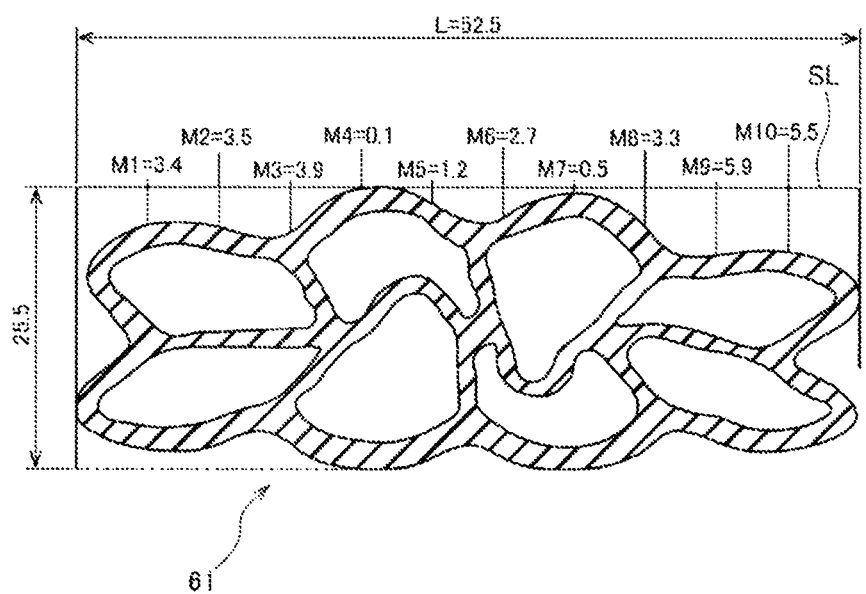
FIG. 8 is a cross-sectional view of a soundproof material 61 under the measurement of the degree of flatness in comparison with the soundproof materials 50A, 50B.
Figure 9:
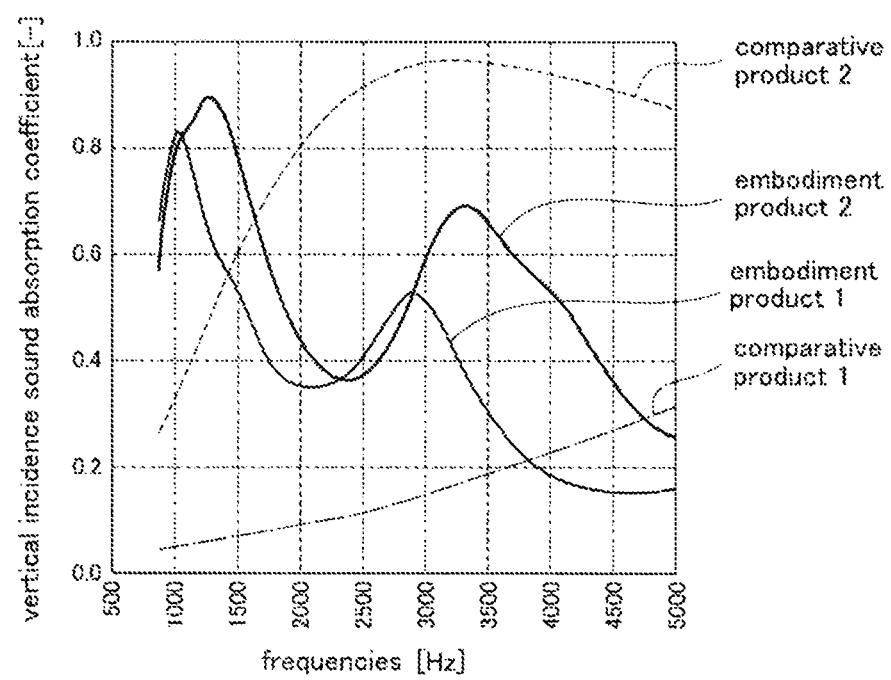
FIG. 9 is a graph showing the frequency characteristics of soundproof materials.

The size of the soundproof material 61 illustrated in FIG. 8 as a comparative example is such that the cross-sectional width L=52.5 mm, M1=3.4 mm, M2=3.5 mm, M3=3.9 mm, M4=0.1 mm, M5=1.2 mm, M6=2.7 mm, M7=0.5 mm, M8=3.3 mm, M9=5.9 mm, M10=5.5 mm, and the average value=3.00 mm.

In this case the percentage of the flatness becomes 5.7%, that is above 2%, with which it can be said that the upper surface of the soundproof material 61 is not flat. The percentage is obtained by diving the average value MA (3.00 mm) by the cross-sectional width L (52.5 mm) ((MA/L× 100)).

The vertical incidence sound absorption coefficient for frequencies of the soundproof material 50A (embodied product 1) illustrated in FIGS. 5 and 6 and the soundproof product 50B (embodied product 2) illustrated in FIG. 7 are measured in accordance with JIS1405-2:2007. The result indicates that both the embodied product 1 and the embodied product 2 have an outstanding sound absorbing effect in the low frequencies of about 800 Hz to 1,000 Hz. In addition, it is also determined that both embodied products 1, 2 similarly have an improved sound absorbing effect in the frequencies of about 2,800 Hz to 3,500 Hz.

The comparative product 1 is a sound absorbing material based on fiber with a thickness of 13 mm while the comparative product 2 is a sound absorbing material based on fiber with a thickness of 27 mm.

The sound absorbing effect of the comparative product 2 is better than the comparative product 1 in the low frequency of about 800 Hz to 1,000 Hz; however, it is less than half that of the embodied products 1, 2, and thus it cannot be said that the sound absorbing effect thereof is sufficient.

To provide a similar effect as the embodied products 1, 2, it is required to have a great thickness such as 40 mm, as in the related art.

The soundproof materials 50 (50A, 50B) have improved hydrophobicity since, as discussed above, it is formed by EPDM sponge that has a specific gravity of 0.2 or less and is entirely extrusion molded, and crosslinked and foamed. Furthermore, they can be used in locations, for example, between the door outer panel and the door inner panel where water containing impurities splashes, since both ends are opened allowing drainage of splashed water non-accumulatively.

In addition, because of the improved flexibility, they can be easily deformed in accordance with the shape of an opposing member to which they are attached, preventing formation of gap for noise with respect to the opposing member. Furthermore, they would not generate contact noise or would not break even when something contacts them caused by vibration.

EPDM sponge in particular has on the cross-sectional outer side part a thin layer called a "skin layer" that has elasticity with the density higher than that of a foamed layer. This elastic thin layer does not allow penetration of water inside but allows entrance of sound by vibration of this layer. The sound (sound waves) entered inside causes attenuation of energy inside, effectively absorbing sound.

The soundproof materials 50 (50A, 50B) each are partitioned by lateral and vertical partition walls 55, 56 forming the plurality of hollow parts 58 each making an air layer. This configuration can shift the sound absorption peak to the low frequencies of about 800 Hz to 1,000 Hz.

Changing the positions of the lateral and vertical partition walls 55, 56 allows for change in the size of the hollow parts 58, resulting in an easy fine adjustment of the sound absorption peak.

The degree of flatness of the upper and lower surfaces 51, 52 of the soundproof materials 50 (50A, 50B) may be determined by definitions other than that of the present embodiment. In this embodiment, the percentage to be obtained by dividing the average value MA by the cross-sectional width L ((MA/L×100)) is 2% or less is acceptable. Here, the average value MA is an average of the lengths of the lines extending downward from a plurality of points, which equally divide the reference line SL in the lateral direction within the range of the cross-sectional width L, and intersecting the upper surface 51.

For example, the degree of flatness can be determined in the following manner. First, the cross-sectional width L, in the left-right direction, of the upper surface 51 of the soundproof material 50A is obtained from the cross-sectional shape of the soundproof material 50A that is not deformed and is brought into contact with the corner part composed of the horizontal plane 201 and the vertical plane 202 as illustrated in FIG. 5B. Then, after defining the flat reference line SL, the maximum value (MB) among those of the lengths of lines is obtained. The lines extend downward from locations on the flat reference line SL and intersect the upper surface 51, wherein the locations corresponding to the left and right ends of the upper surface 51 are excluded. Furthermore, the percentage is obtained by dividing the maximum value MB by the cross-sectional width L ((MB/L)×100) and 5% or less of the obtained percentage is determined to be acceptable.

In this case, the degree of flatness can be determined further smaller by defining it less than "5% or less".

The soundproof material 50A illustrated in FIGS. 5B and 6 has the maximum value of 2.5 mm and the percentage obtained by dividing the maximum value MB by the cross-sectional width L ((MB/L)×100) becomes 3.6%.

Likewise, the soundproof material 50B illustrated in FIG. 7 has the maximum value of 1.5 mm and the percentage obtained by dividing the maximum value MB by the cross-sectional width L ((MB/L)×100) becomes 2.6%. Similarly, the soundproof material 61 illustrated in FIG. 8 has the maximum value of 5.9 mm and the percentage obtained by dividing the maximum value MB by the cross-sectional width L ((MB/L)×100) becomes 11.2%.

Defining the degree of flatness as described above prevents irregular gaps that can otherwise be generated between the soundproof material and an opposing member and that are difficult to control. Furthermore, this allows mass production of the soundproof material in accordance with the determined definition.

Next, a manufacturing method of the soundproof material 50 will be described.

Figure 14:
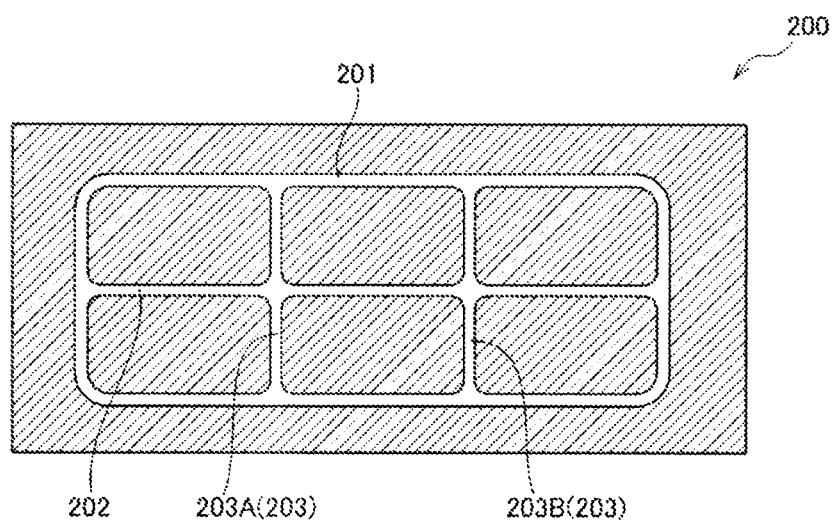
FIG. 14 is a cross-sectional view of an extrusion die used for extrusion molding of the soundproof material manufactured by the method according to the embodiment of the present invention.

First, a rubber composition is passed through an extrusion die 200, illustrated in FIG. 14, provided to the discharge part of an extruder, not illustrated, to be applied with extrusion molding. Then, the extrusion-molded rubber composition is heated with hot air inside a microwave heating device (UHF furnace), not illustrated, with which it absorbs microwaves. The rubber composition thus generates heat, whereby it is crosslinked and foamed, forming the soundproof material 50.

The extrusion die 200 has a cross-sectional shape including so-called an outer rectangular annular part 201 formed of a seamless continuous belt part having a rounded rectangular shape with a uniform width. The extrusion die 200 also has a lateral muscle part 202 extending laterally so as to divide evenly and vertically the rectangular annual part 201 into two sections. The extrusion die 200 further has vertical muscle parts 203 (two vertical muscle parts 203A, 203B in this case) extending vertically to divide evenly and laterally the rectangular annular part 201 into three sections. These parts 201, 202, 203 are connected together in a continuous manner. Here, the rounded rectangular shape is a rectangle with rounded corners and is determined to be one of the variations of the rectangle.

The rubber composition used as material of extrusion molding includes at least EPDM, a crosslinking agent, a foaming agent, and carbon black (CB) as reinforcing material. Furthermore, as a characteristic feature, the rubber composition is added with a small amount of carbon nanotube (CNT), which performs high heat generation by microwaves.

Examples of the non-conjugated diene of the ethylene/α-olefin copolymer (EPDM; ethylene-α-olefin-nonconjugated diene copolymer) include 1,4-hexadiene, dicyclopentadiene, and 5-ethylidene-2-norbornene. etc. Examples of α-olefins include propylene, 1-butene, 1-pentene, 1-hexene, 4-methyl-1-pentene, 1-octene, 1-decene and the like.

Examples of the crosslinking agent include sulfur and peroxides, etc., and sulfur is used in the present invention.

Examples of the foaming agent include azo compounds, nitroso compounds, hydrazine derivatives, sodium bicarbonate compounds, and microcapsules, etc. Physical foaming may be performed without use of a foaming agent, or both may be used in a combined manner.

Alternatively, inorganic fillers, softening agents, vulcanization accelerators, or the like may be selected and added to the rubber composition.

Examples of the inorganic filler include calcium carbonate, and examples of the softening agent include liquid polybutene, mineral oil, liquid polyisobutylene, and liquid polyacrylic acid ester.

Examples of vulcanization accelerators include thiazole-based and thiuram-based accelerators.

Usable carbon nanotubes include single-walled carbon nanotubes and multi-walled carbon nanotubes. The aggregate shapes of carbon nanotubes include a particulate shape (hair-ball shape) and a bundle shape (bunch shape) etc, but are not limited.

The soundproof material 60A illustrated in FIG. 4A or the one with crushed and deformed hollow parts result from a rubber composition containing at least EPDM, a crosslinking agent, a foaming agent and carbon black. The material 60A is applied with extrusion molding through the extrusion die 200 illustrated in FIG. 14 and applied with crosslinking and foaming in the hot-air type heating device.

This is because of the deviation of timing in crosslinking and foaming between an outer part and an inner part of the soundproof material 50. Specifically, the outer part receiving the hot air is initially locally crosslinked, foamed, and cured before the inner part is crosslinked and foamed. The deviation of timing adversely and greatly affects the quality of the shape of the soundproof material 50 that is made of belt-like seamless rubber sponge with a uniform width and is formed into a rectangular cross-sectional shape with a plurality of hollow parts.

It is well known that the microwave heating is effective to evenly heat outer and inner parts simultaneously.

Figure 15A:
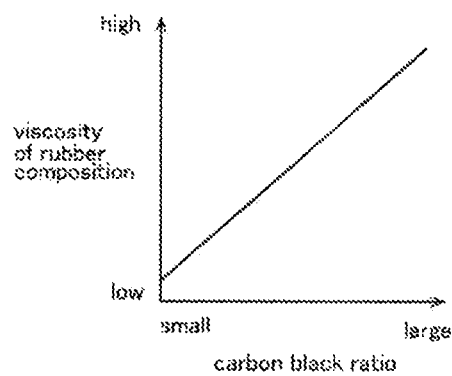
FIG. 15A is a graph showing the characteristics of carbon black and illustrating the relation between ratio of carbon black and viscosity of rubber.
Figure 15B:
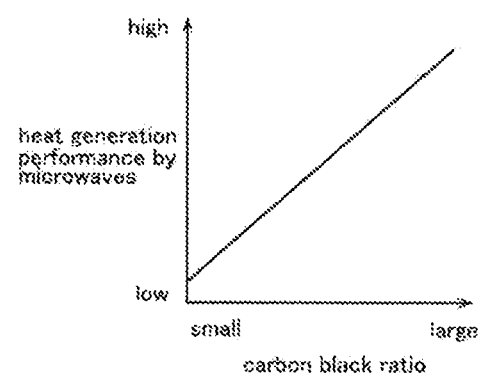
FIG. 15B is a graph showing the characteristics of carbon black and illustrating the relation between the ratio of carbon black and heat generating performance in a microwave heating device.

When the ratio of carbon black contained in the rubber composition is increased to generate sufficient heat by microwaves, the generation of heat by microwaves is enhanced as illustrated in FIG. 15B and at the same time the viscosity of the rubber composition is increased as illustrated in FIG. 15A. The rubber composition with high viscosity results in restrained foaming. This inhibits formation of highly foamed, or low specific gravity of rubber sponge. Thus, reduction of the carbon black ratio to reduce the viscosity of the rubber composition is required for manufacture of a rubber sponge with a low specific gravity of 0.2 or less. In this case, however, sufficient generation of heat by microwaves cannot be achieved.

Acknowledging that carbon nanotubes have much higher heat generation performance by microwaves than the carbon black, the inventors of the present invention have invented to add a small amount of carbon nanotubes to the rubber composition to provide a rubber composition having both a high heat generation performance and low viscosity, which results in the rubber composition with a low specific gravity after being foamed.

Figure 16:
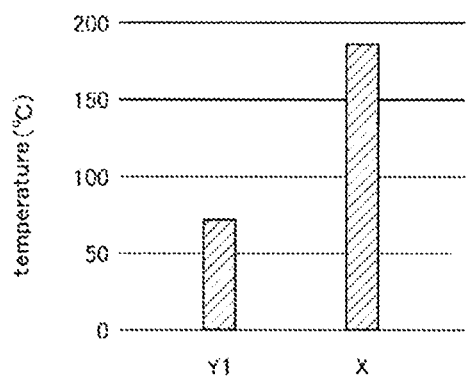
FIG. 16 is a graph showing the temperature of a specimen formed by a rubber composition after being heated by microwaves.

FIG. 16 shows the surface temperatures (measured using a contact-type thermometer) of a nonvulcanized (not crosslinked) specimen of a rubber composition X of the present invention added with carbon nanotubes and a nonvulcanized (not crosslinked) specimen of a rubber composition Y of a related art not added with carbon nanotubes. They are heated inside a microwave heating device for 60 seconds under the atmosphere temperature of 100° C. at an output power of 4.0 Kw. The rubber composition X and the rubber composition Y have the same composition with an exception that the X is added with 1.0 Phr of carbon nanotubes.

As shown in FIG. 16, the rubber composition X has the surface temperature that is much greater than that of the rubber composition Y. This indicates that the rubber composition added with carbon nanotubes generates much more heat by microwaves.

The minimum Mooney viscosity (Vm) and Mooney scorch time (T5) of the nonvulcanized (not crosslinked) rubber composition were determined according to JIS K 6300. The vulcanization speed was measured using a JSR curelastometer. The evaluation was made based on the time T10 (minutes) to reach 10% ME and the time T90 (minutes) to reach 90% ME, while the difference between the minimum value ML and the maximum value MH of the torque obtained from the vulcanization curve is defined as ME (=MH−ML). The result is shown in Table 1 below.

TABLE 1

| | | related art Y | present invention X |
|---|---|---|---|
| | added amount of CNT (phr) | — | 1 |
| mooney scorch test (125° C.) | Vm | 16.9 | 18.3 |
| | T5 (minutes) | 7.0 | 7.0 |
| curelastometer vulcanization test (180° C. for 10 minutes) | ML (kgf × m) | 0.60 | 0.68 |
| | MH (kgf × m) | 6.59 | 7.10 |
| | T10 (minutes) | 0.63 | 0.61 |
| | T90 (minutes) | 2.08 | 2.12 |
| | occupied amount of CB (%) *1 | 14.5 | 14.5 |
| | CNT + occupied amount of CB (%) *2 | 14.5 | 14.8 |

*1 Added weight of CB ÷ Gross weight of rubber kneading
*2 Added weight of (CNT + CB) ÷ Gross weight of rubber kneading As shown in Table 1, the rubber composition X and the rubber composition Y indicate almost identical result in the Mooney scorch time (T5), and T10 and T90 by the curelastometer. Accordingly, it is understood that they have similar vulcanization (crosslinking) speed by heating. In addition, the rubber composition X is slightly higher than the rubber composition Y in the minimum Mooney viscosity (Vm) and the minimum value ML and maximum value MH by the curelastometer. This is considered to be an effect of carbon nanotubes that the rubber composition X additionally contains.

Figure 17:
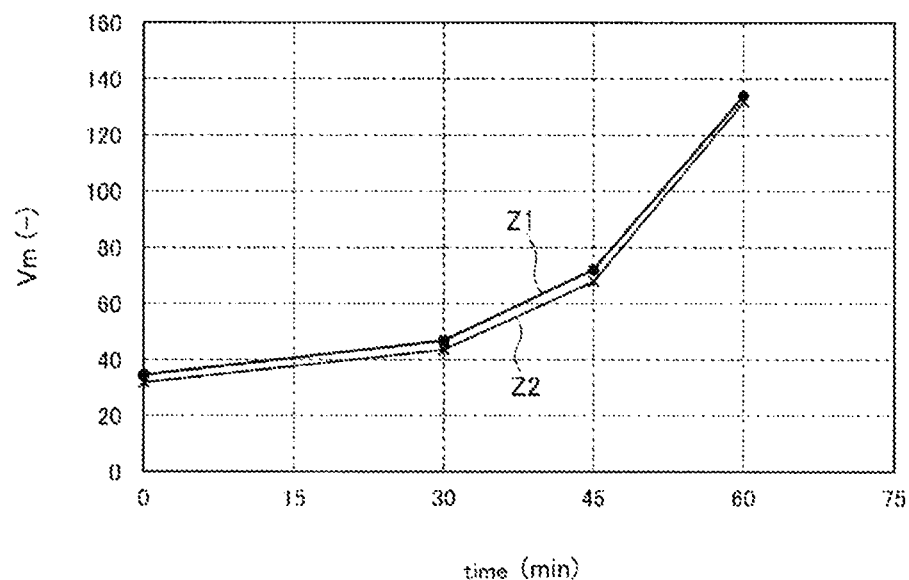
FIG. 17 is a graph showing the lowest Mooney viscosity (Vm) of the specimen formed by the rubber composition at each processing time after receiving external heating.

FIG. 17 shows the minimum Mooney viscosity (Vm) of a nonvulcanized specimen of the rubber composition Z1 of the present invention added with carbon nanotubes and a nonvulcanized specimen of the rubber composition Z2 of the related art not added with carbon nanotubes. The rubber composition Z1 and the rubber composition Z2 are heated inside a hot air circulation-type heating device at the atmosphere temperature of 90° C. The point is that the rubber compositions are heated from outer sides only. The Mooney viscosity (Vm) is measured at each processing time (30 minutes, 45 minutes, 60 minutes). The rubber composition Z1 and the rubber composition Z2 have the same composition with an exception that the rubber composition Z1 is added with 0.8 phr of carbon nanotubes.

As shown in FIG. 17, the rubber composition Z1 and the rubber composition Z2 are almost identical in the minimum Mooney viscosity (Vm) in each processing time. The rubber composition Z1 could have been much greater than that of the rubber composition Z2 if addition of carbon nanotubes could accelerate vulcanization (crosslinking) by outer side heating. However, it was not so. This indicates that addition of a small amount of carbon nanotubes about 0.8 phr affects little influence to the vulcanization (crosslinking) in outer side heating.

Figure 4B:
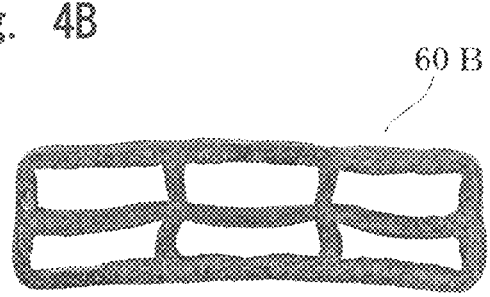
FIG. 4B is a photograph showing a cross-sectional view of a soundproof material 60B having flat upper and lower surfaces.

A soundproof material 60B illustrated in FIG. 4B, for example, was successfully manufactured, the material being formed by rubber sponge having a specific gravity of 0.2 or less and having flat upper and lower surfaces 51, 52. The soundproof material 60B is manufactured in such a manner that a rubber composition added with carbon nanotubes is extrusion molded through the extrusion die 200 as illustrated in FIG. 14 and is heated by hot air supplied from the microwave heating device. The soundproof material 60B has a rounded rectangular outer shape and has six hollow parts 58 in total inside. Two of the hollow parts 58 are formed by a lateral partition wall 55 extending in the left-right lateral direction and three of the hollow parts 58 are formed by vertical partition walls 56 extending in the vertical direction.

In this case, the amount of carbon nanotubes added is 2.0 phr; however, it is not limited. Although 2.0 phr or more of carbon nanotubes can be added for better heat generation by microwaves, smaller amount is preferred from an economic viewpoint. Thus, the amount of carbon nanotubes to be added is preferably 3.0 phr or less, and more preferably 2.5 phr or less, and further preferably 2.0 phr or less and 0.5 phr or more. The amount less than 0.5 phr is not preferred due to reduced heat generation by microwaves.

The extrusion die 200 illustrated in FIG. 14 is used to form a soundproof material illustrated in FIG. 6 that has six hollow parts 58 in total, two columns in the vertical direction and three rows in the lateral direction. Alternatively, for the soundproof material 50B illustrated in FIG. 7 having eight hollow parts 58 in total, that is two columns in the vertical direction and four rows in the lateral direction, an extrusion die that forms these eight hollow parts can be used.

The soundproof materials 50A, 50B each have a lateral partition wall 55 to form two columns of hollow parts 58 in the vertical direction. Alternatively, each of them may have two lateral partition walls 55 to form nine hollow parts 58 in total, three columns in the vertical direction and three rows in the lateral direction, with use of an extrusion die having a corresponding shape. The number of partition walls 55, the number of rows and columns of the hollow parts 58 in lateral and vertical directions, and the shape of the hollows parts 58 may be modified into various modes, which are included in the present invention within the requirement of the present invention. They are formed into the predetermined shapes with use of the extrusion dies having cross-sectional shapes corresponding to those of the soundproof materials.

Although carbon nanotubes are sometimes used as composite materials with rubber because of their excellent electrical and thermal conductivity, the method to form the soundproof material using such carbon nanotubes, as discussed in the present embodiment, does not exist and no prior art document discusses such an idea. In the present embodiment, the soundproof material 50 is extrusion-molded, which has the rounded rectangular outer shape in cross section, has at least two hollow parts 58 in the vertical direction formed by the lateral partition wall 55 extending in the left-right lateral direction, and has at least two hollow parts 58 in the lateral direction formed by the vertical partition wall 56 extending in the vertical direction. The rubber composition, which is the material to be extrusion-molded, is added with carbon nanotubes to achieve high heat generation by microwaves and low specific gravity after being foamed, to provide the soundproof material 50 that is formed by rubber sponge having the specific gravity 0.2 or less after crosslinking and foaming and has the hollowed shape with stabilized flat upper and lower surfaces 51, 52.

The soundproof material 50 manufactured by the method of this embodiment is applied to the sheet body part 31. Alternatively, the soundproof material 50 may be provided as a component inside an engine and a tire, besides the automobile door 100.

Also, the soundproof material 50 is applicable to doors of trains, ships, aircraft, etc., and floors and walls of houses, besides the automobiles.

Moreover, the soundproof material 50 is usable as a heat insulation material with an additional process of closing both ends by die molding or the like.

We claim:

1. A method of manufacturing a soundproof material, the soundproof material comprising rubber sponge having a specific gravity of 0.2 or less, the rubber sponge being formed by extrusion molding and a subsequent crosslinking and foaming of a rubber composition using a microwave heating device, the rubber composition including at least raw-material rubber, a crosslinking agent, a foaming agent, and carbon black, the soundproof material having a rectangular cross-sectional outer shape, the soundproof material having at least two hollow parts inside formed by a lateral partition wall extending in a left-right lateral direction, the soundproof material having at least two hollow parts formed by a vertical partition wall extending in a vertical direction, the method comprising adding carbon nanotubes to the rubber composition.

2. The method as claimed in claim 1, wherein the amount of the carbon nanotubes to be added is 3.0 phr or less.

* * * * *